June 9, 1953   G. F. L. N. SARACENI   2,641,143
PLANETARY TRANSMISSION
Filed Dec. 6, 1948   2 Sheets-Sheet 1

Inventor
G.F.L.N. SARACENI
BY Mascott Downing Seeber
Attorneys

June 9, 1953     G. F. L. N. SARACENI     2,641,143
PLANETARY TRANSMISSION

Filed Dec. 6, 1948     2 Sheets-Sheet 2

Inventor
G. F. L. N. SARACENI
By Attorneys

Patented June 9, 1953

2,641,143

UNITED STATES PATENT OFFICE 2,641,143

PLANETARY TRANSMISSION

Guido Fernando Luis Nicolas Saraceni,
Buenos Aires, Argentina

Application December 6, 1948, Serial No. 63,775

3 Claims. (Cl. 74—705)

The present invention relates to a planetary transmission including constantly meshed gears adapted to provide a fixed gear ratio between the input and output shafts.

The invention further consists in such a planetary transmission utilizing two differential mechanisms, both housed in a common casing and interconnected by an intermediate gearing arrangement that reverses the direction of rotation of the output shaft with respect to the input shaft.

More particularly the invention relates to a planetary transmission embodying a gear casing which is divided by an apertured web, provided by radially extending aligned projections, into two compartments, a differential mechanism is disposed in each compartment and an intermediate shaft passes through the aperture in the web in operative association with each of the differential mechanisms. Additionally, gears are journalled on stub shafts on the projects having their axes perpendicular to the axis of the intermediate shaft and these additional gears mesh with further gears in respective association with the differential mechanisms whereby the rotation of the first differential is reversed with respect to the second so that the output rotation is reversed relative to the input rotation.

Specifically the invention therefore has for an object to provide a compact planetary gearing arrangement in which a unique casing structure is embodied and which casing structure includes a transverse bearing support extending through the space between the projections and the support carrying a bearing that journals the intermediate shaft.

Figure 1:
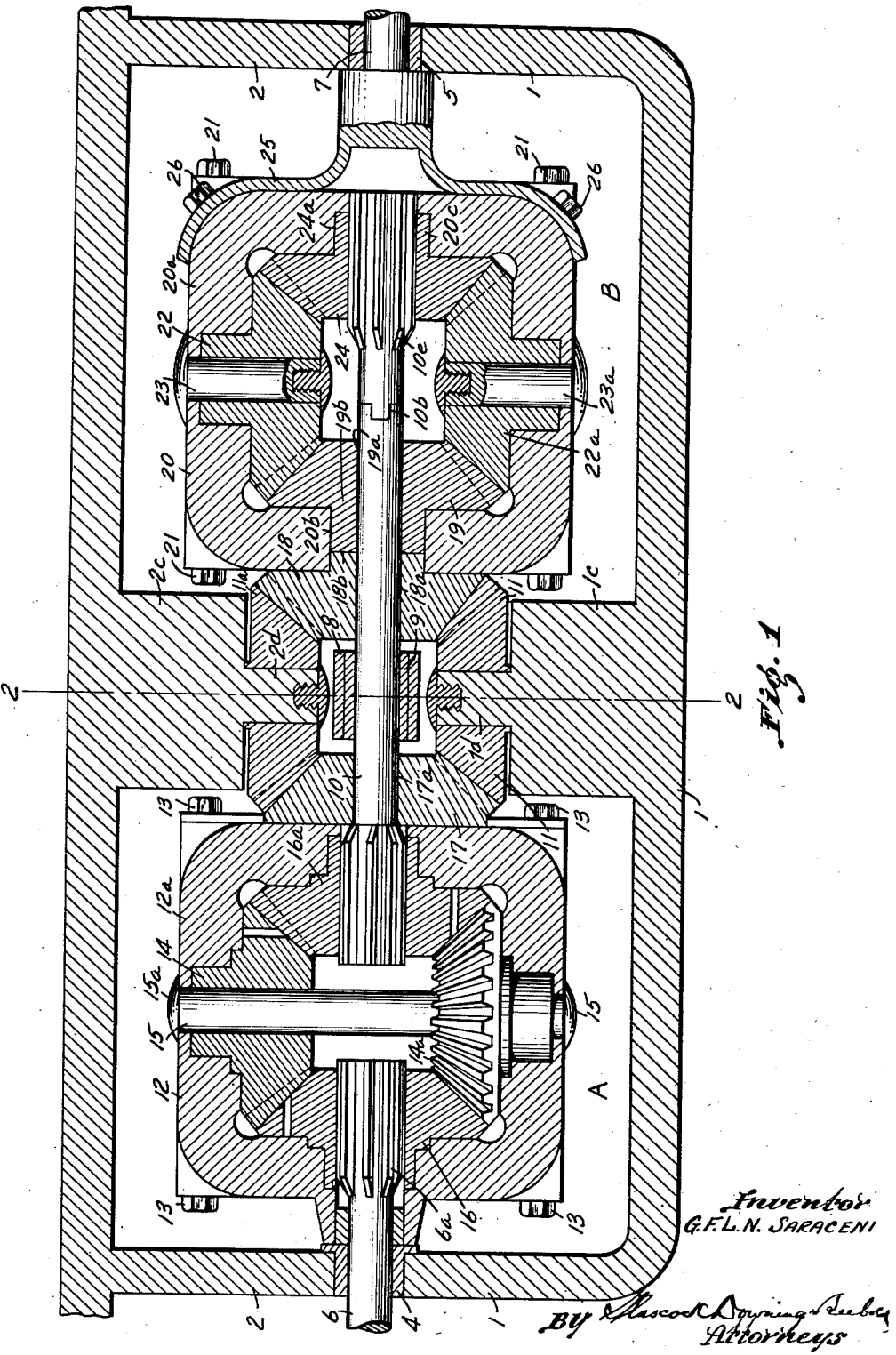
Figure 2:
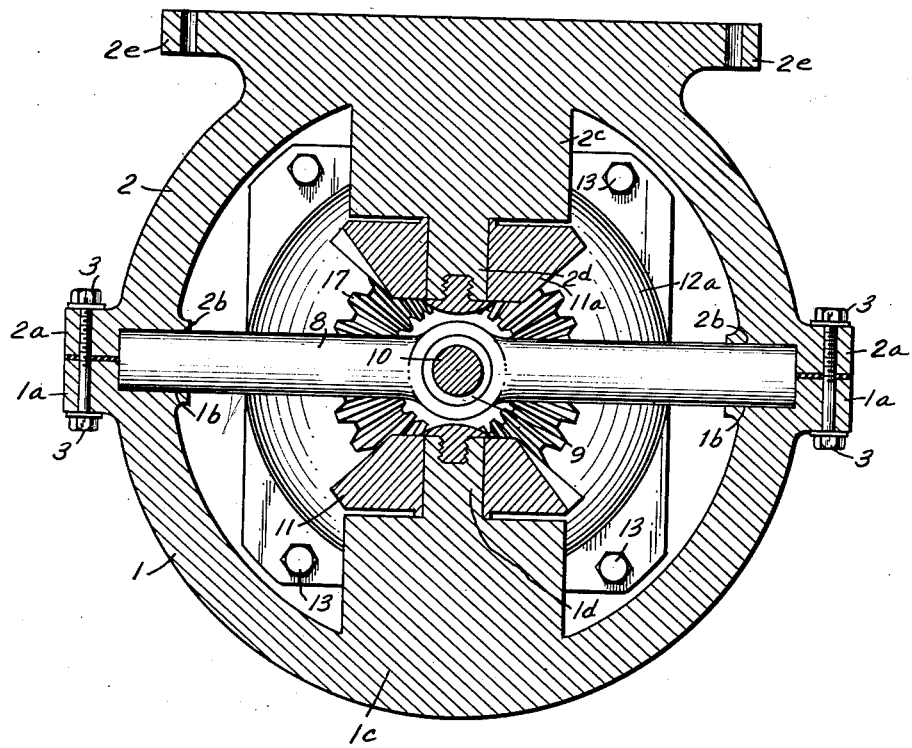

Further and additional specific objects will be apparent from the following description taken in connection with the accompanying drawings illustrating the invention and in which:

Figure 1 illustrates a vertical section through a gear casing constructed in accordance with the invention and embodying the differential mechanisms and in which some of the shafts are in elevation and others are partly in elevation and partly in section, and Figure 2 is a transverse view taken along line 2—2 in Figure 1, with some of the parts shown in elevation.

In the drawings the gear casing is provided by separate wall means each constituting a casing half and comprising a lower half 1 provided with a laterally extended flange 1ª and an upper half or cover 2 provided with a mating laterally extending flange 2ª. Suitable means are provided for connecting the casing halves together and the drawings indicate, by way of example, the screw bolts 3. Each end of the casing half when joined together constitute a closed end for the casing and at one end, the left hand side viewed in Figure 1, is provided a bearing 4 that supports and journals a driving shaft 6 while at the opposite end, the right hand end, is provided a bearing 5 that journals an output shaft 7. At the central portion of the casing and as shown in Figure 2, each of the casing halves is provided with mating socket portions respectively denoted at 1ᵇ and 2ᵇ. Mounted in these socket portions is a transversely extending bearing support or element in the form of the bar or rod 8 which is enlarged at its central portion and apertured to accommodate a bearing 9 that supports a shaft 10 referred to hereinafter.

Radial projections 1ᶜ and 2ᶜ extend from the respective casing halves inwardly toward one another and terminate in spaced relation. These projections therefore divide the casing comprised by the lower part 1 and the cover 2 into two compartments. The cover, as shown in Figure 2, is provided with lateral flanges 2ᵉ that are utilized for mounting the casing with the gearing contained therein to a suitable support.

Each of the compartments of the casing accommodates a differential mechanism denoted generally at A and B. The differential mechanism A includes a hollow rotatable casing formed by component sections 12 and 12ª fastened to each other by screw bolts 13. The drive shaft 6 projects within this hollow casing and has splined thereto a driving gear 16. A transversely extending stub shaft 15 crosses the hollow casing of the differential and carries conical gears 14, 14ª in mesh with the driving gear 16. A headed retaining screw 15ª mounts the stub shaft 15 within the casing. A gear 16ª constituting a driven gear is aligned with the gear 16 and mounted within the casing in mesh with gears 14, 14ª. This gear 16ª is splined to an intermediate shaft 10 which extends from within the first differential mechanism through the space provided by the projections 1ᶜ, 2ᶜ and into and through the second differential mechanism B mounted in the other compartment.

Fastened to the outer face of the casing section 12ª is a conical gear 17 that is apertured at 17ª so that it is free with respect to the intermediate shaft 10. Satellite gears 11 and 11ª respectively mounted on stub shafts 1ᵈ and 2ᵈ provided on the facing ends of he projections 1ᶜ, 2ᶜ are in mesh with the gear 17. These gears are further inmesh with a gear 18 apertured at 18ª so that it is free to turn about intermediate shaft 10. The gear 18 being coupled with a similar conical gear 19 mounted within the second differential mechanism B. It thus follows that rotation imparted to the bear 17 is reversed by the satellite gears 11, 11ª so that any output rotation of gear 19 is opposite to that of gear 17. The gear 19 is provided with a tubular projection 19ᵇ and is coupled to a similar projection 18ᵇ of the gear 18 and these two projections rotate freely within an aperture 20ᵇ formed in the casing providing the second differential mechanism B.

The second differential mechanism includes a rotatable hollow casing provided by mating sections 20, 20ª which are coupled together by the screw bolts 21. Four conical gears are mounted within this casing. The gear 19 discussed previously, as well as opposed gears 22, 22ª respectively mounted on short stub shafts 23, 23ª and another gear 24 that is splined to the extension 10ᵇ of the intermediate shaft 10. The gear 24 is provided with a bearing projection 24ª that journals the same within an aperture 20ᶜ of the section 20ª of the differential mechanism B. Splines 10ᶜ couple the gear 24 to the extension of the driving shaft 10. A supporting element 25 is coupled to the output shaft 7 and by means of screw bolts 26 it is connected to the section 20ª of the differential mechanism B. It thus follows that the output shaft rotates with the rotatable casing of the second differential while the input shaft 6 is journaled within the casing of the first differential A.

In operation the drive shaft 6 imparts rotation to driving gear 16 which through the differential mechanism A results in rotation of the aligned driven gear 16ª. Load factors applied to the output shaft 7 applied backwards through the second differential B coupled with the interposition of the reversing device constituted by the gear 17 coupled for rotation with the casing of the first differential, the satellite gears 11, 11ª and gears 18 and 19, as well as the action of gear 24 mounted on intermediate shaft 10 tend to effect the locking of gears 22 and 22ª so that the casing of differential mechanism B rotates reversely with respect to the input shaft 6.

It will therefore be clear that the present invention provides in a planetary transmission a compact gearing arrangement and casing combination including wall means that each define a casing half with suitable means connecting the halves together and projections provided respectively on the half extending toward one another terminating in mutually spaced aligned relation to divide the casing into two compartments. A differential mechanism is mounted in each compartment and in the first compartment is constituted by a hollow rotatable gear casing with the drive shaft projected within the same and journaled in one end wall of the casing. A driving gear is mounted on the drive shaft and an aligned driven gear is supported within this hollow casing. There is a stub shaft that traverses the casing transversely of the axis of the drive shaft and carries spaced opposed gears respectively meshing with the drive and driven gears in the first casing. The driven gear of the first casing is mounted on an intermediate shaft that extends from within the first casing through the space separating the projections and into and through an extension through the second differential mechanism mounted in the other casing half. A rod member is mounted in sockets formed in the respective casing halves at the central portion thereof and which rod member, constituting a bearing support, extends transversely through the space between the projections. A bearing is mounted on this rod to support the intermediate shaft.

A driven shaft is mounted to project outwardly of the wall means at the opposite end of the casing in alignment with the drive and the intermediate shafts and a rotatable hollow casing of the second differential is connected to the driven shaft. A driving gear is mounted on the intermediate shaft within the second rotatable casing and aligned stub shafts extend in this casing transversely of the axis of the intermediate shaft. These shafts are shortened and each carries a gear meshing respectively with the driving gear on the intermediate shaft that is within the second gear casing. A reverse gear drive is provided and extends between the casing of the first differential and the interior of the second differential and includes a gear carried by the casing of the first differential in mesh with aligned intermediate gears journaled on the projections. A gear is in mesh with these intermediate gears and is further coupled to a driven gear within the second casing from whence it follows that input from the drive shaft through the action of the constantly meshed gears within the two casing halves results in a reversed rotation of the driving shaft.

Therefore, the invention consists of joining through a mechanical linking element, two differential systems in which the number of revolutions of shaft A of the first differential A adjusts itself to the number of revolutions of the non-driving gearing 16ª and shaft 10, to a second differential system B in such a way that the inverted rotation of gearing 16ª with the non-driving shaft 10 and its corresponding rotation sense, become planetary gearings 19 and 24 of the second differential system and in turn originate the rotation of shaft 7, this last one being the connecting element to transmit the motive power.

The different constructional details and the materials used may vary to a certain extent, without departing from the basic idea of the present invention.

I claim:

1. In a planetary transmission, a first differential gearing including a rotatable gear casing with aligned driving and driven gears carried thereby, a driving shaft on which the driving gear is mounted, an aligned intermediate shaft on which the driven gear is mounted, a second differential gearing including a rotatable gear casing with a driving gear therein on the intermediate shaft, and driven gear, a reverse gear arrangement intermediate the rotatable gear casing of the first differential gearing and the driven gear of the second differential gearing, and an aligned driven shaft connected to the rotatable gear casing of the second differential gearing and rotatable in a direction reverse to the direction of rotation of the driving shaft.

2. In a planetary transmission, wall means each defining a casing half, means connecting the wall means together to provide a hollow casing, each of said wall means embodying opposite ends, centrally located projections extending inwardly from the wall means and terminating within the same in mutually spaced aligned relation, said projections dividing the casing into two compartments, a first differential gearing in one of said compartments and including a hollow rotatable gear casing, a drive shaft projecting within said hollow casing and journalled in one end of the wall means, a driving gear carried by said drive shaft, an aligned driven gear supported within said gear casing, a stub shaft traversing said gear casing transversely of the axis of said drive shaft and spaced opposed gears carried thereby and in meshing engagement with the respective drive and driven gears, an intermediate shaft keyed to said driven gear extending within said gear casing and passing through the space separating the projections, a transversely extending bearing support extending through the space between the projections transversely of the axis of said intermediate shaft, a bearing carried by said support and journalling said intermediate shaft, a driven shaft journalled in the opposite wall means in alignment with the drive and intermediate shafts, a second differential gearing in the other compartment of the casing and including a rotatable hollow gear casing, means connecting the gear casing to the driven shaft, said intermediate shaft extending through said second rotatable gear casing, a driving gear mounted on the intermediate shaft within said second casing, aligned stub shafts projecting within said second casing transversely of the axis of the intermediate shaft, a gear on each stub shaft meshing with the last-mentioned driving gear, a driven gear supported by said intermediate shaft within said second casing and meshing with the gears on the stub shafts, and a reverse gear drive including a first gear carried by and rotating with said first-mentioned rotatable casing and surrounding said intermediate shaft, aligned intermediate gears journalled on the respective projections and meshing with the gear on the first-mentioned rotatable casing, and another gear meshing with said intermediate gears and coupled to the driven gear within said second-mentioned rotatable casing whereby said second-mentioned rotatable casing and the driven shaft rotates reversely with respect to the direction of rotation of the drive shaft and the driving gear within said first-mentioned rotatable casing.

3. In a planetary transmission as defined in and by claim 2, said transversely extending bearing support comprising a rod member and said casing halves having mating socket portions therein to receive and support the opposite ends of said rod member.

GUIDO FERNANDO LUIS
NICOLAS SARACENI.

References Cited in the file of this patent

UNITED STATES PATENTS

| Number | Name | Date |
|---|---|---|
| 204,462 | Utterback | June 4, 1878 |
| 282,962 | Crocker | Aug. 14, 1883 |
| 317,186 | Pattison | May 5, 1885 |
| 934,716 | Dodd | Sept. 21, 1909 |
| 2,101,233 | Bancroft | Dec. 7, 1937 |
| 2,484,921 | Wolff | Oct. 18, 1949 |

FOREIGN PATENTS

| Number | Country | Date |
|---|---|---|
| 703,779 | France | May 6, 1931 |
| 806,628 | France | Sept. 28, 1936 |
| 854,166 | France | Apr. 6, 1940 |